(12) United States Patent
Scherer et al.

(10) Patent No.: US 9,577,904 B2
(45) Date of Patent: Feb. 21, 2017

(54) NETWORKING CABLE TRACER SYSTEM

(71) Applicant: MERTEK INDUSTRIES, LLC, Austin, TX (US)

(72) Inventors: Christopher Briand Scherer, Austin, TX (US); Jonathan Keith Sholtis, Buda, TX (US)

(73) Assignee: MERTEK INDUSTRIES, LLC, Austin, TX (US)

( * ) Notice: Subject to any disclaimer, the term of this patent is extended or adjusted under 35 U.S.C. 154(b) by 0 days.

(21) Appl. No.: 14/868,966

(22) Filed: Sep. 29, 2015

(65) Prior Publication Data
US 2016/0020975 A1    Jan. 21, 2016

Related U.S. Application Data

(63) Continuation of application No. 13/643,700, filed as application No. PCT/US2011/000738 on Apr. 27, 2011, now Pat. No. 9,196,975.

(60) Provisional application No. 61/343,471, filed on Apr. 29, 2010.

(51) Int. Cl.
| | |
|---|---|
| G02B 6/36 | (2006.01) |
| H04L 12/26 | (2006.01) |
| G02B 6/44 | (2006.01) |
| G02B 6/38 | (2006.01) |
| H01R 9/03 | (2006.01) |
| H01R 13/641 | (2006.01) |
| H01R 13/6463 | (2011.01) |
| H01R 13/70 | (2006.01) |
| G02B 6/42 | (2006.01) |

(52) U.S. Cl.
CPC ......... *H04L 43/0811* (2013.01); *G02B 6/3817* (2013.01); *G02B 6/447* (2013.01); *H01R 9/032* (2013.01); *H01R 13/641* (2013.01); *H01R 13/6463* (2013.01); *H01R 13/70* (2013.01); *G02B 6/428* (2013.01)

(58) Field of Classification Search
CPC ........ G02B 6/3817; G02B 6/428; G02B 6/447
See application file for complete search history.

(56) References Cited

U.S. PATENT DOCUMENTS

| | | | |
|---|---|---|---|
| 3,960,428 A | 6/1976 | Naus et al. | 439/315 |
| 4,761,720 A | 8/1988 | Solow | 362/235 |
| 4,837,488 A | 6/1989 | Donahue | 324/66 |
| 5,159,316 A | 10/1992 | Lazzara | 340/568.2 |
| 5,666,453 A | 9/1997 | Dannenmann | 385/101 |
| 5,741,152 A | 4/1998 | Boutros | 439/490 |
| 5,764,043 A | 6/1998 | Czosnowski et al. | 324/66 |
| 5,888,100 A | 3/1999 | Bofill et al. | 439/676 |
| 6,002,331 A | 12/1999 | Laor | 340/539.1 |
| 6,080,007 A | 6/2000 | Dupuis et al. | 439/418 |
| 6,099,345 A | 8/2000 | Milner et al. | 439/460 |
| 6,238,235 B1 * | 5/2001 | Shavit | H01R 13/6471 439/418 |

(Continued)

FOREIGN PATENT DOCUMENTS

CN        1331505        1/2002

*Primary Examiner* — Rhonda Peace
(74) *Attorney, Agent, or Firm* — Norton Rose Fulbright US LLP

(57) ABSTRACT

A method and apparatus for providing a tracer function for networked cable systems used for data or power transmission. A self contained and self powered indicator circuit is described that enables tracing the location of both ends of a networked cable.

19 Claims, 7 Drawing Sheets

(56) References Cited

U.S. PATENT DOCUMENTS

| | | |
|---|---|---|
| 6,244,908 B1 | 6/2001 | Hammond et al. ............ 439/676 |
| 6,280,232 B1 | 8/2001 | Beecher et al. .............. 439/418 |
| 6,394,853 B1 | 5/2002 | Hammond et al. ............ 439/676 |
| 6,524,128 B2 | 2/2003 | Marowsky et al. ........... 439/418 |
| 6,532,328 B1 | 3/2003 | Kline ........................... 385/101 |
| 6,558,204 B1 | 5/2003 | Weatherley ................... 439/676 |
| 6,577,243 B1 | 6/2003 | Dannenmann et al. . 340/815.45 |
| 6,790,096 B2 | 9/2004 | Lin ................................ 439/676 |
| 6,798,183 B2 | 9/2004 | Bohley et al. ................... 324/66 |
| 6,811,445 B2 | 11/2004 | Caveney et al. .............. 439/676 |
| 6,975,242 B2 | 12/2005 | Dannenmann et al. . 340/815.45 |
| 7,049,937 B1 | 5/2006 | Zweig et al. .................. 340/657 |
| 7,080,945 B2 * | 7/2006 | Colombo ............. G02B 6/3895 385/53 |
| 7,081,808 B2 | 7/2006 | Colombo et al. ............. 398/166 |
| 7,168,994 B2 | 1/2007 | Caveney et al. .............. 439/676 |
| 7,221,284 B2 | 5/2007 | Scherer et al. .......... 340/815.45 |
| 7,226,217 B1 | 6/2007 | Benton et al. ................... 385/89 |
| 7,335,066 B2 | 2/2008 | Carroll et al. ................. 439/676 |
| 7,374,458 B2 | 5/2008 | Caveney et al. .............. 439/676 |
| 7,513,787 B2 * | 4/2009 | AbuGhazaleh .... H01R 13/6463 439/344 |
| 7,547,150 B2 | 6/2009 | Downie et al. .................. 385/92 |
| 7,556,536 B2 | 7/2009 | Caveney et al. .............. 439/676 |
| 7,760,094 B1 | 7/2010 | Kozischek et al. ........ 340/572.1 |
| 7,772,975 B2 | 8/2010 | Downie et al. ............ 340/572.1 |
| 7,782,202 B2 | 8/2010 | Downie et al. ............ 340/572.1 |
| 7,910,833 B2 | 3/2011 | McGinley et al. ................. 27/8 |
| 7,910,834 B2 | 3/2011 | McGinley et al. ................. 18/8 |
| 7,920,764 B2 | 4/2011 | Kewitsch ....................... 385/101 |
| 7,940,182 B2 | 5/2011 | Lange et al. ............... 340/572.1 |
| 7,960,648 B2 | 6/2011 | McGinley et al. .............. 174/36 |
| 7,965,186 B2 | 6/2011 | Downie et al. ............ 340/572.1 |
| 7,972,183 B1 | 7/2011 | Lin ................................ 439/676 |
| 8,043,124 B2 | 10/2011 | Caveney et al. .............. 439/676 |
| 8,210,755 B2 | 7/2012 | Lavranchuk .................... 385/53 |
| 8,264,355 B2 | 9/2012 | Kozischek et al. ........ 340/572.1 |
| 8,277,260 B2 | 10/2012 | Caveney et al. |
| 8,606,972 B2 | 12/2013 | Abuelsaad et al. |
| 8,611,234 B1 * | 12/2013 | Gershman ............... H04L 41/12 370/251 |
| 8,620,123 B2 * | 12/2013 | Dean, Jr. ............ G02B 6/02033 385/100 |
| 8,702,453 B2 | 4/2014 | Caveney et al. |
| 2002/0031955 A1 | 3/2002 | Schmidt et al. ............... 439/676 |
| 2002/0048990 A1 | 4/2002 | Marowsky et al. ........... 439/418 |
| 2003/0157842 A1 | 8/2003 | Arnett et al. .................. 439/676 |
| 2003/0199192 A1 | 10/2003 | Caveney et al. .............. 439/418 |
| 2003/0222786 A1 | 12/2003 | Dannenmann et al. . 340/815.45 |
| 2004/0038564 A1 | 2/2004 | Yan .............................. 439/76.1 |
| 2004/0160774 A1 | 8/2004 | Lionetti et al. ................ 362/253 |
| 2005/0037672 A1 | 2/2005 | Caveney et al. .............. 439/692 |
| 2005/0224585 A1 | 10/2005 | Durrant et al. ................ 235/492 |
| 2006/0134996 A1 | 6/2006 | Caveney et al. .............. 439/676 |
| 2006/0162947 A1 | 7/2006 | Bolouri-Saransar et al. .. 174/36 |
| 2006/0232385 A1 | 10/2006 | Scherer et al. .......... 340/286.02 |
| 2007/0105453 A1 | 5/2007 | Caveney et al. .............. 439/676 |
| 2007/0116411 A1 | 5/2007 | Benton et al. ................... 385/53 |
| 2007/0190863 A1 | 8/2007 | Caveney et al. .............. 439/676 |
| 2008/0020658 A1 | 1/2008 | Provost ............................ 440/71 |
| 2008/0122579 A1 | 5/2008 | German et al. ............... 340/10.1 |
| 2009/0269973 A1 | 10/2009 | Caveney et al. .............. 439/460 |
| 2010/0079248 A1 | 4/2010 | Greveling .................... 340/10.1 |
| 2010/0098425 A1 | 4/2010 | Kewitsch ....................... 398/116 |
| 2011/0043333 A1 | 2/2011 | German ........................ 340/10.1 |
| 2011/0116748 A1 | 5/2011 | Smrha et al. .................... 385/76 |
| 2012/0058689 A1 | 3/2012 | Caveney et al. .............. 439/676 |
| 2013/0039624 A1 | 2/2013 | Scherer et al. ................... 385/92 |
| 2013/0052860 A1 | 2/2013 | Caveney et al. .............. 439/460 |

* cited by examiner

NETWORKING CABLE TRACER SYSTEM

CROSS-REFERENCE TO RELATED APPLICATIONS

This application is a continuation of Ser. No. 13/643,700, filed Oct. 26, 2012, which is a national phase application under 35 U.S.C. §371 of International Application No. PCT/US2011/000738, filed Apr. 27, 2011, which claims priority to U.S. Provisional Patent Application No. 61/343,471, filed Apr. 29, 2010, the contents of all three applications are incorporated by reference in their entirety.

FIELD

This description relates to improved methods and apparatus for readily tracing remote connective portions of networking cables use for transferring data or power that are widely used in the information technology sector.

BACKGROUND

The purpose of any networking cable is to carry data or power from one electronic device to another. Electronic devices include but are not limited to terminals, personal computers, printers, workstations, hubs, switches, storage devices, tape drives, routers, telephone switches, and servers. Networking cables, frequently referred to, as "jumper cables", "patch cables", or simply "cables", typically are multiple pair copper wires packaged in an outer flexible sheath. Networking cables are designed to interconnect an electronic device with another electronic device. Such networking cables often are used in systems where there are many networking cables connected to frames, panels, or electronic devices, each of which may have many connecting cables and which may be located closely adjacent other similar frames, panels, or electronic devices, sometimes without carefully regimented management of the cables. The connections of each cable may be remote from one another, even being in separate rooms or spaces, and the networking cables may be of substantial length.

One example of such use of networking cables is in computer centers where it is often necessary to connect a networking cable from an individual workstation at one location with another networking cable from a computer server remote from the workstation. Further the interconnections sometimes are located in crowded and/or cramped quarters. Tracing and identifying a remote connector section or end of a specific cable for changing its connection in a network or to facilitate replacement often is difficult, tedious and time consuming, and can lead to errors that create further service problems and additional costs.

Various methods and systems have been developed for locating the ends of a networking cable. One such method is a trial and error process that requires personnel to use test equipment at both ends of each and every wire pair to identify the termination points. This process may be labor intensive and expensive. The second method is a variation of the first method and involves the use of equipment to send a tone on a wire pair and then detect a particular frequency at the termination point. This process is also labor intensive. Also, to determine termination points, the cable needs to be disconnected from the computers connected to the network. As a result, these methods interfere with performance and require the workstation to be taken out of service. In addition, both systems require the test person to walk from one end of a test point to the other end. If the workstation and server are located in separate rooms or in remote locations, the previous methods are labor intensive and inefficient for easy detection of termination ends.

U.S. Pat. No. 6,577,243 to Dannenmann, et. al. describes a network cable tracing system that addresses some of these issues. Electrically activated telltales, such as light emitting diodes (LED's) are affixed to both ends of a networking cable and are activated when power is applied externally with a plug-in connection from a portable power pack. The resulting illumination of the LED's readily indicates where both ends of the networking cable are located. A system similar to this is offered by Cypress Industries, of Austin, Tex. and called the LED Cat5E RJ-45 Patch Cable. A solution of this type is useful and an improvement over some of the aforementioned labor intensive test methods. This approach has not been widely adopted though because it requires the technician to purchase a rather limited use power pack, carry it along with all of his or her other tools and individually plug it into each networking cable as part of a test protocol. Each cable also has to have a plug in connection on each end of the cable for the power pack to be attached.

An improved application is described in U.S. Pat. No. 7,221,284 to Scherer et al., which describes a self contained and self powered indicator circuit that enables tracing the location of both ends of a networked cable without the use of external test equipment, providing an indicator circuit for signaling a cable connection between two electronic devices including at least a networking cable having a plurality of conductor wire pairs encased in a flexible sheath; a connection hood on each end of the networking cable; an electrically activated telltale incorporated into each connection hood and electrically connected to at least one of the conductor wire pairs; an electric power source incorporated into at least one of the connection hoods and in electrical connection with the electrically activated telltales; and a manually operated switch incorporated into at least one of the connection hoods and in electrical connection with the electrically activated telltales.

The invention disclosed in U.S. Pat. No. 7,221,284 provided limited functionality in use. More functionality than one simple response from the manual press button is a need. In addition increased reliability demands for Cat-6 cables requires a new approach because building the increased electronics required to add the aforementioned new functionality into the confines of a cable connector which has twisted pair connections can lead to crosstalk resulting in degraded performance of the cable. In addition users desire an indicator that the electric power source is going low and a way of testing when the electric power source has lost power.

BRIEF SUMMARY

It is therefore an aspect of this development to provide a network cable tracing system that is contained to the network cables, low in cost, and straightforward to use.

It is another aspect that the test function is implemented simply by pushing a button on the networking cable hood.

It is another aspect that the electric power source required is provided by a battery or the capability of coupling into Power Over Ethernet in the network cable hood.

It is another aspect that no external test equipment is required.

These and other aspects and features are achieved by providing an indicator circuit for signaling a cable connection between two electronic devices including at least a networking cable having a plurality of conductor wire pairs encased in a flexible sheath; a connection hood on each end of the networking cable; an electrically activated telltale incorporated into each connection hood and electrically connected to at least one of the conductor wire pairs; an electric power source incorporated into at least one of the connection hoods and in electrical connection with the electrically activated telltales; a separator mechanism incorporated into the connection hood to provide separation of the conductor wire pairs to minimize crosstalk; and a manually operated switch incorporated into at least one of the connection hoods and in electrical connection with the electrically activated telltales.

Further aspects and features are achieved by providing an indicator circuit for signaling a cable connection between two electronic devices including at least a networking cable having a plurality of conductor wire pairs encased in a flexible sheath; a connection hood on each end of the networking cable; an electrically activated telltale incorporated into each connection hood and electrically connected to at least one of the conductor wire pairs; an electric power source incorporated into at least one of the connection hoods and in electrical connection with the electrically activated telltales; a manually operated switch incorporated into at least one of the connection hoods and in electrical connection with the electrically activated telltales; and electric circuit elements incorporated into each hood connection and in electrical connection with the electrically activated telltales; and a separator mechanism incorporated into the connection hood to provide separation of the conductor wire pairs to minimize crosstalk wherein the electric circuit elements complete the circuit for a prescribed amount of time when activated by the manually operated switch.

Further aspects and features are achieved by providing an indicator circuit for signaling a cable connection between two electronic devices including at least a networking cable having a plurality of conductor wire pairs encased in a flexible sheath; a connection hood on each end of the networking cable; an electrically activated telltale incorporated into each connection hood and electrically connected to at least one of the conductor wire pairs; an electric power source incorporated into at least one of the connection hoods and in electrical connection with the electrically activated telltales; a manually operated switch incorporated into at least one of the connection hoods and in electrical connection with the electrically activated telltales; an integrated circuit chip, incorporated into each hood connection and in electrical connection with the electrically activated telltales; and a separator mechanism incorporated into the connection hood to provide separation of the conductor wire pairs to minimize crosstalk; wherein the integrated circuit chip completes the circuit for a prescribed amount of time when activated by the manually operated switch.

Further aspects and features are achieved by providing a networking cable for transmitting data comprising a plurality of conductor wire pairs encased in a flexible sheath; a plurality of twisted copper wire pairs encased in a flexible sheath; an electrically activated telltale incorporated into each connection hood and electrically connected to at least one of the conductor wire pairs; a electric power source incorporated into at least one of the connection hoods and in electrical connection with the electrically activated telltales; manually operated switch incorporated into each connection hood and in electrical connection with the electrically activated telltales; electric circuit elements incorporated into each hood connection and in electrical connection with the electrically activated telltales; and a separator mechanism incorporated into the connection hood to provide separation of the conductor wire pairs to minimize crosstalk wherein the electric circuit elements complete the circuit for a prescribed amount of time when activated by the manually operated switch.

Further aspects and features are achieved by providing a networking cable for transmitting data comprising a plurality of conductor wire pairs encased in a flexible sheath; a plurality of twisted copper wire pairs encased in a flexible sheath; an electrically activated telltale incorporated into each connection hood and electrically connected to at least one of the conductor wire pairs; a electric power source incorporated into at least one of the connection hoods and in electrical connection with the electrically activated telltales; manually operated switch incorporated into each connection hood and in electrical connection with the electrically activated telltales; and an integrated circuit chip, incorporated into each hood connection and in electrical connection with the electrically activated telltales; wherein the integrated circuit chip completes the circuit for a prescribed amount of time when activated by the manually operated switch.

In another aspect the integrated circuit chip in the connector hood is replaced by an RFID tag and the RFID tag collects records identifier information related to the connection location of the cable and transmits the information to an RFID reader for possible transmittal to a computer for analysis.

Further aspects include the capability to provide multiple modes of testing and indications to the user including the capability of firing the telltale indicator for different times depending on how the user pushes the button on each end of the cable.

Further aspects include the capability to connect a electric power source tester to either end of the cable.

DETAILED DESCRIPTION

Figure 1:
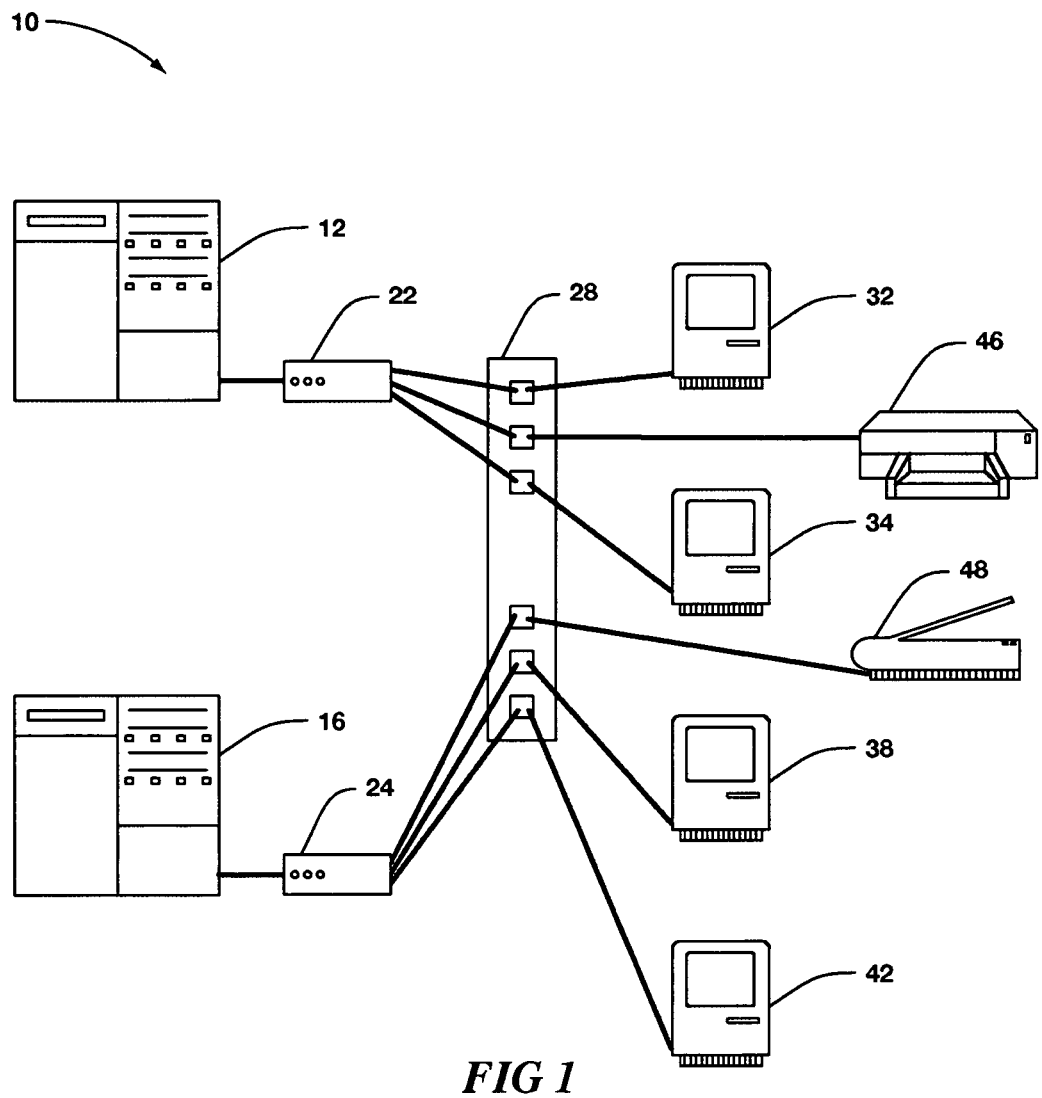
FIG. 1 is a schematic view of a networked computer environment.

FIG. 1, shown generally by the numeral 10, illustrates, by way of background, a typical networked environment that includes servers, computers, hubs, peripheral devices, and a cable panel.

In this example computers 32, 34, 38, and 42 are each connected by networking cables to a cable panel 28. The computers can be at multiple locations. Also attached to panel 28 by networking cable are peripheral devices such as printer 46 and scanner 48. Panel 28 is often located at a central room where service personnel can access it. From panel 28 multiple computers and peripheral devices are often then linked by networked cables to hubs such as 22 and 24, which then are connected to servers such as 12 and 16. Typically, one room may house multiple servers and hubs. Various protocols are used to support data transfer between computer and server pairs. A typical protocol is Ethernet.

The example shown is a small network and typical networks are much larger. In addition to the devices shown in FIG. 1 a network could include, but is not limited to, other electronic devices such as workstations, switches, tape drives, storage devices, telephone switches, VOIP devices, and routers. The application anticipates any electronic device that can be part of a network. With large networks the total number of networking cables is large and routine maintenance functions as well as the addition or change of computers can lead to significant time and manpower requirements in tracing down connections throughout the system.

Figure 2:
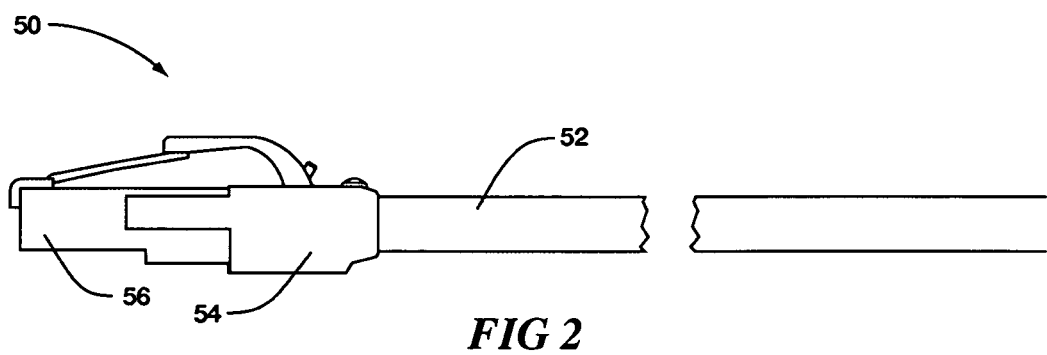
FIG. 2 is a diagrammatic front elevation view of the networking cable.

FIG. 2, shown generally by the numeral 50, illustrates the networking cable that may be used in the networked environment of FIG. 1. Cable 52, as used in networking applications is typically composed of a plurality of insulated twisted conductor wire pairs encased in a flexible outer cover sheath. The number of twisted conductor wire pairs can vary depending on the application.

Some well known standards are Category 5 cabling standard, which has four insulated twisted copper wires encased in an outer jacket layer. These are referred to as Cat-5 cables. A growing use is in Cat6 cables for Ethernet applications. Cat-6 is a cable standard for Gigabit Ethernet and other network protocols that are backward compatible with the Category 5/5e and Category 3 cable standards. Compared with Cat-5 and Cat-5e, Cat-6 features more stringent specifications for crosstalk and system noise. The cable standard provides performance of up to 250 MHz and is suitable for 10 BASE-T, 100 BASE-TX (Fast Ethernet), 1000 BASE-T/1000 BASE-TX (Gigabit Ethernet) and 10 GBASE-T (10-Gigabit Ethernet). Category 6 cable has a reduced maximum length when used for 10 GBASE-T; Category 6a cable, or Augmented Category 6, is characterized to 500 MHz and has improved alien crosstalk characteristics, allowing 10 GBASE-T to be run for the same distance as previous protocols. Category 6 cable can be identified by the printing on the side of the cable sheath. Several other standards are in use and the use of any of them is anticipated. An additional conductor wire or wire pair is added so that a Cat-5 or Cat-6 cable can perform the tracing function described herein. The extra conductor wire will be referred to in this description as the indicator wire. It should also be noted that the composite cable may consist of coaxial, twin-axial, twisted, untwisted, shielded and unshielded pair wires, as is known in the art. Accordingly, the term "networking cable" is used in this description and in the appended claims will encompass all such variations of composite cable, including those that carry data and those that carry power.

A connector assembly made up of a standard connector 56 coupled to a boot 54 on the end of the networking cable provides for the connection of the cable to the various networked devices. A typical connector 56 is an RJ-45, an eight wire connector commonly used in networking computers. A preferred embodiment is the use of a 10 conductor RJ-45. The use of a 10 conductor RJ-45 allows the insertion of an additional cable pair from the main distribution frame (MDF) to the intermediate distribution frame (IDF), which enables a continuous continuity path that enables the use of the telltale light indicator on each end of the cable. The overall connecter (connector plus boot) will be referred to as the connector hood in this description and in the appended claims.

Figure 3:
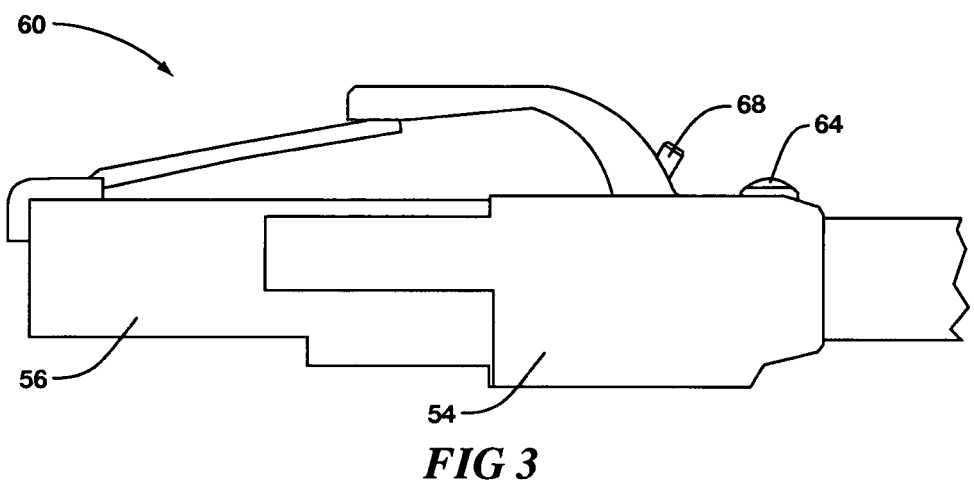
FIG. 3 is a diagrammatic front elevation view of the hood of the networking cable.

FIG. 3, shown generally as the numeral 60 is a slightly enlarged illustration of the connector hood. Near the rear section of boot 54 is an electrical telltale 64, which can be used to produce an audio or visual signal for tracing network cables. For purposes of this description and the appended claims a telltale can be any electrically triggered device that emits a visual or audio signal that can be detected by a human. A preferred telltale is a light emitting diode (LED), but could be other visual indicators such as a conventional light bulb, or a liquid crystal visual indicator. A button 68 is shown, which can be manually pressed to engage a manual switch (not shown) which competes an indicator circuit that causes the telltale LED to flash repeatedly for a predetermined time. The indicator circuit includes the indicator wire or wire pair that runs the complete length of the networking cable. It is important to note that the hood shown in FIG. 2, which is shown on the "left" end of the networking cable has a identical twin hood on the "right" end that has identical circuitry as well as an LED and manual switch and is in electrical connection via the indicator wire or wire pair. The exact location of the button and telltale is not critical and they can be located on various surfaces of the connector hood.

Figure 4:
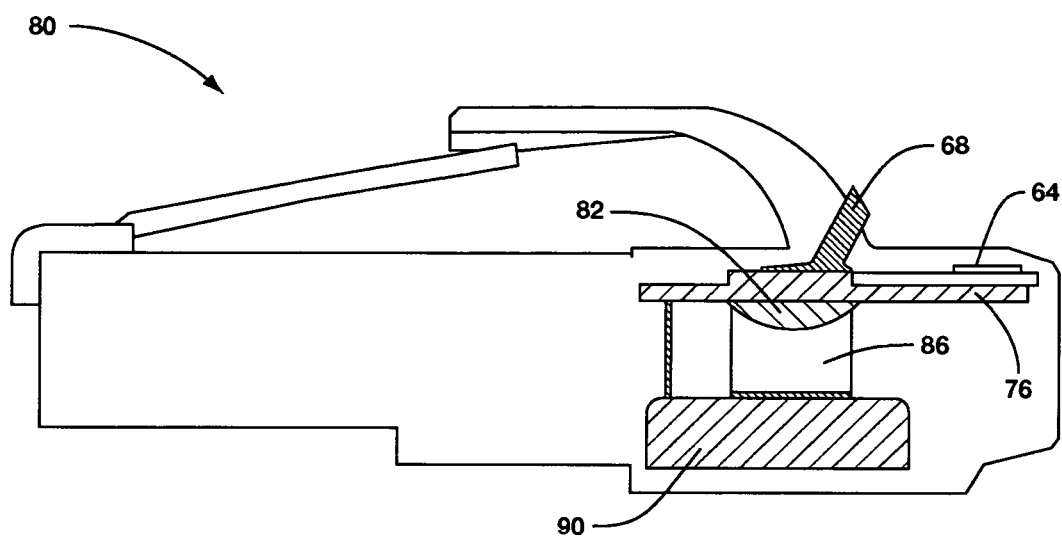
FIG. 4 is a diagrammatic cross section front elevation view of the hood of the networking cable.
Figure 5:
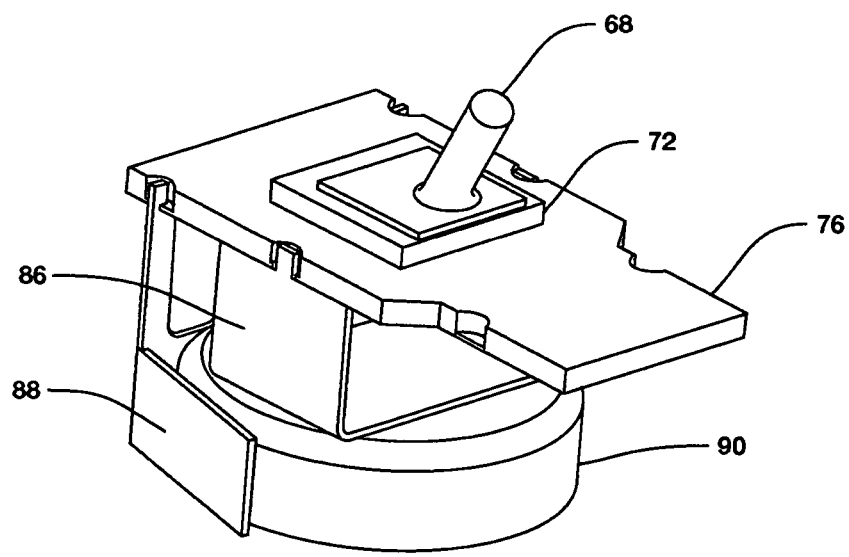
FIG. 5 is an interior view of the some of the interior elements of the hood of the networking cable.

FIG. 4, shown generally by the numeral 80 is another side view of an embodiment of a hood shown in cross section to demonstrate some of the internal components. Button 68 is connected physically to a switch (to be shown) which when manually engaged completes an electrical circuit that powers electrical telltale 64. Referring to FIG. 5 button 68 engages switch 72 that is mounted on printed circuit board 76. Below printed circuit board 76 is an integrated circuit 82 (FIG. 4) that provides part of the intelligence of one of the embodiments and will be described further. Referring back to FIG. 5 printed circuit board 76 is in electrical connection to a electric power source 90 via positive connection 86 and negative connection 88. The wiring of a complete electrical circuit between electrical telltale 64, switch 72, integrated circuit 82, and electric power source 90 is done through the common printed circuit board 76.

Figure 6:
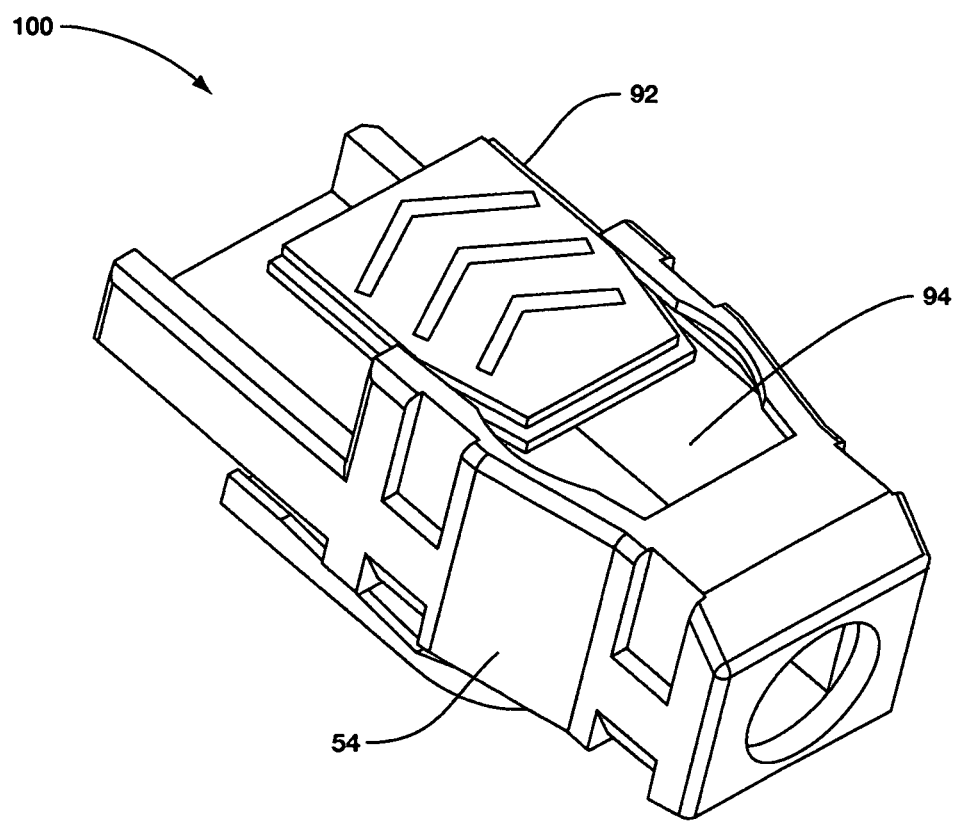
FIG. 6 is a diagrammatic bottom elevation view of the boot of the networking cable.

FIG. 6, shown generally by the numeral 100, is a bottom view of boot 54 to show the embodiment in which the electric power source is a battery and in which door 92 can be moved to an open position to expose the battery port 94 where the battery (90 in FIG. 5) can be inserted. A number of batteries can be used in this application. For the circuit components discussed in the example a preferred battery is a CR927 3-volt lithium battery. A number of similar batteries are available from other manufacturers and the use of any of them is anticipated.

It is further anticipated that power could be supplied by other means than a battery. The power for the display capability of the networking cable could supplied from Power Over Ethernet (POE), a technology for safely passing electrical power, along with data on Ethernet cabling. In addition, other electric power sources, such as solar are possibilities.

Another important aspect is the ability to have a useful and long-lived tracer circuit with only the on board electric power sources. This is especially important in the embodiment of an on board battery. Accordingly when the switch 72 is engaged by pushing button 68 (FIGS. 4-5) it is desirable for the electrical telltales to signal for a prescribed amount of time but then shut off to conserve power. This can be accomplished in several ways. The simplest circuit would be one in which the circuit is engaged and drawing power from electric power source 90 once the first button 68 is pushed and is disengaged when one of the buttons 68 is pushed again. This embodiment is functional though it suffers from the weakness that users may accidentally push one of the buttons and leave the circuit engaged, draining the power from electric power source 90. An improved embodiment (the second embodiment) is one in which pushing one of the buttons 68 engages power to the circuit for a prescribed amount of time and then disengages power to the circuit, conserving electric power source power. A number of simple electronic circuits could perform that function. Fortunately very small and low cost integrated circuits designed to do exactly that as well as pulse the power are commercially available in large quantities. Integrated circuit board X1622 available from Fulikai Electronic Technologies (China), is manufactured and sold to numerous toy manufacturers to provide a blinking light function to many toys. It is also used in the well-known shoes sold to children that have blinking LED lights that are activated when children press down on the shoes while walking. A number of similar integrated circuits are available from other manufacturers and the use of any of them is anticipated.

In another embodiment an integrated circuit is used that provides several options for an end user. One combination is a circuit that a) flashes for 20 seconds upon one button push and then shuts off automatically, b) flashes for 40 seconds after holding button down for 3 seconds, and then shuts off automatically, c) stops flashing instantly upon a button push on either end, and d) flashes continuously if the button is pressed 3 times. In another aspect the integrated circuit is enabled to detect and automatically indicate when the electric power source power begins to go low.

In yet another embodiment a Radio Frequency Identification circuit, often called an RFID tag, replaces the integrated circuit 82. The use of an RFID tag expands the uses of the proposed networking cable. The RFID tag can be used for example to store information on the Media Access Control address (MAC address) of the device that one end of the network cable is attached to, or the jack number, port address, IP address, workstation identifier, or server identifier. The user can then use an RFiD reader to quickly scan the other end of the networking cable and get a complete readout of the exact location of the cable connection without having to walk around looking for a flashing light on the other end.

In another embodiment (not shown) the connector hood will accept a device that functions as a electric power source tester at either end of the cable.

In another embodiment the integrated circuit includes functionality that automatically indicates a condition of low electric power source power.

The addition of the additional electronics described above into a standardized or miniature connector, such as an RJ-45, is challenging and typically requires cutting the cable jacket back to allow room for the electronics. Cutting back the jacket can compromise the cable's signal integrity because the cable's twisted pair conductors are no longer held at the required minimum distance from each other to prevent cross talk between signals in the cable's conductors. Cross talk compromises the cable's value for data communications. Thus an additional aspect is a designed separator that supplies the required fit and function to allow a separate channel for each twisted pair of the communications cable.

Figure 7:
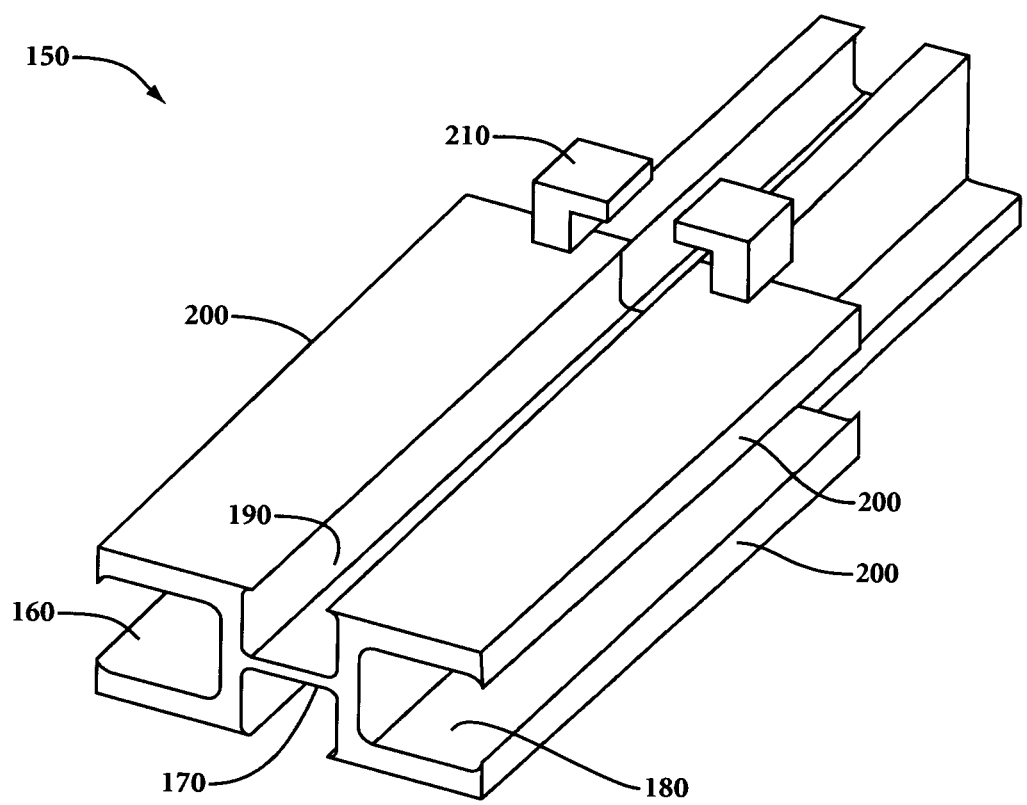
FIG. 7 is a view of the separator.

FIG. 7 illustrates such a separator. It is sized to fit completely within the jack at the end of the communications cable. The separator 150 is molded from a non-conductive material and has channels 160, 170, 180, and 190 for four twisted wire pairs coming from the communications cable. The separator maintains the twisted wire separation all through the connector jack. Channel 180 may carry in addition to one of the twisted wire pairs the indicator wire or wire pair that will carry the signal to the PCB board. The use of separator 150 will allow the routine use of four twisted wire systems housed inside an over molded communications jack and in the presence of electronics inside the jack while maintaining the minimum crosstalk necessary to meet CAT6 reliability standards.

The resulting networking cable is a completely self-contained tracing cable. It enables any technician or user to simply push one button to check for the location of the opposite end of a cable in a networked system. In the case of the second embodiment the telltale indication ceases after a prescribed amount of time, conserving electric power source power. But several other testing functionalities are possible and were discussed earlier.

Figure 8:
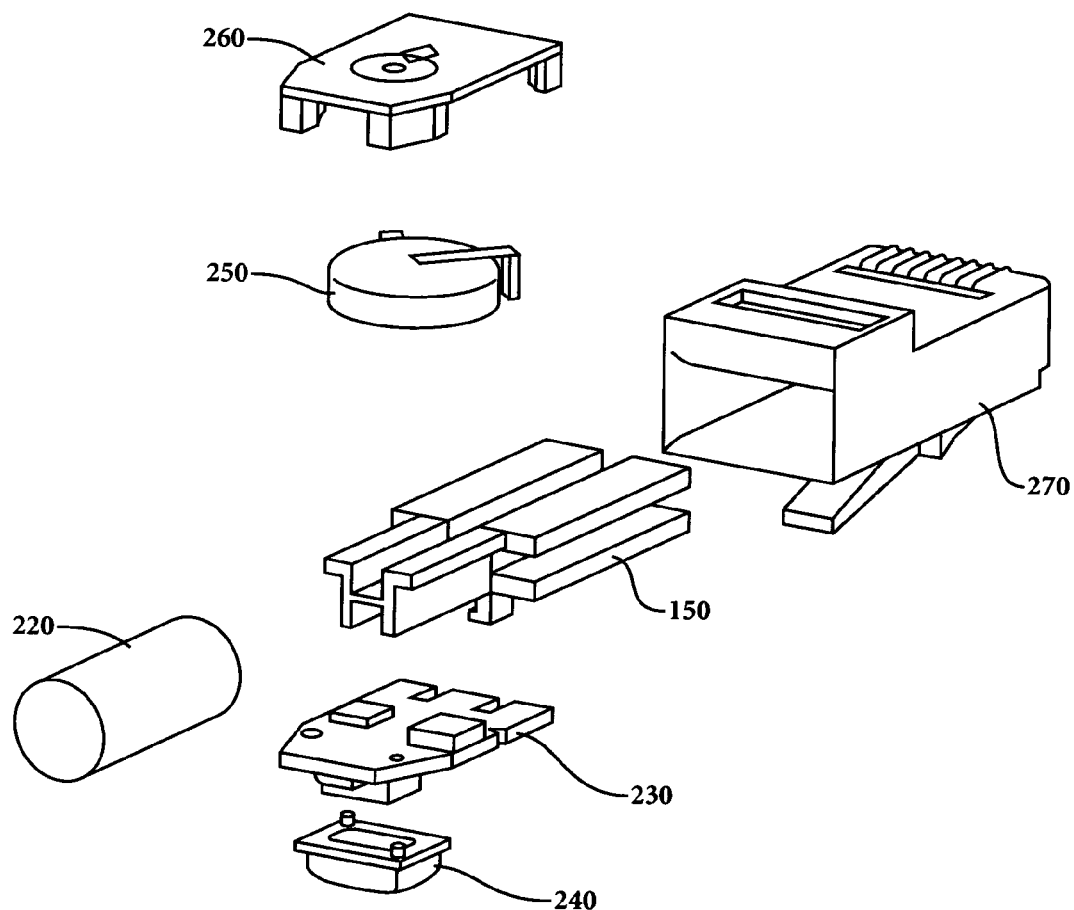
FIG. 8 is an exploded view of the end jack of the cable tracer system.

FIG. 8 illustrates a possible configuration in an exploded view making use of the separator 150 of FIG. 7. The separator 150 accepts the twisted wire pairs (not shown) from cable 220. The four twisted wire pairs and indicator pair would be channeled into the four channels of separator 150. The printed circuit board 230, containing all of the electronics for the tracer functionality would be attached immediately below separator 150 and be connected to the indicator pair wires. A pushbutton 240 is attached below the printed circuit board. A electric power source 250 and electric power source cover 260 is above the separator and the complete assembly located inside connector jack 270.

Figure 9:
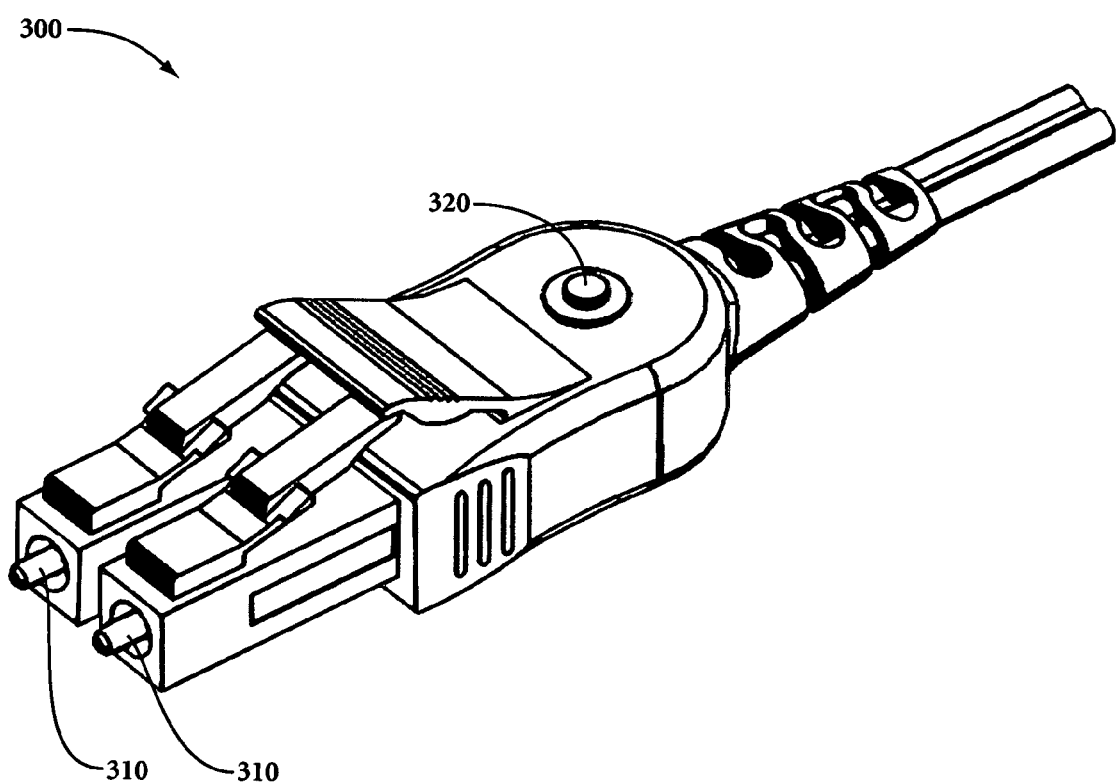
FIG. 9 is a view of a connector jack system for a fiber optic cable system.

It should be noted that the proposed cable tracer system proposed could also be used for fiber optic communications cables. Implementation of this embodiment requires that at least one conductor wire be deployed along the length of the fiber optic cable to act as the indicator wire described earlier. The electronics and functionality of the tracer testing would be identical to that described earlier. FIG. 9 illustrates a connector jack system 300 designed for implementation in a fiber optic system. The fiber optic connectors 310 are shown, as is button 320. The enclosure contains the other elements (electric power source, PCB board, etc) that operate the same way as in the non fiber optic embodiments described above.

While several variations have been described above with references to specific embodiments thereof, it is apparent that many changes, modifications and variations in the materials, arrangements of parts and steps can be made without departing from the inventive concept disclosed herein. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

The invention claimed is:

1. An indicator circuit for signaling a cable connection between two electronic devices comprising:
   a. a networking cable having a plurality of conductor wire pairs encased in a flexible sheath;
   b. a connector hood on each end of the networking cable;
   c. an electrically activated telltale incorporated into at least one of the connector hoods and electrically connected to at least one of the conductor wire pairs;
   d. an electric power source incorporated into at least one of the connector hoods and in electrical connection with the electrically activated telltale;

e. two separator mechanisms each incorporated into a different one of the connector hoods to provide separation of the conductor wire pairs to minimize crosstalk, each separator mechanism comprising a body having a first end facing a distal end of the respective connector hood, a second end, and a plurality of longitudinal channels extending along only part of a length of the separator between the first and second ends, the plurality of longitudinal channels including:
  a first channel opening through an upper surface of the body;
  a second channel opening through a bottom surface of the body;
  a third channel on a left side of the first and second channels; and
  a fourth channel on a right side of the first and second channels;
where each separator mechanism further includes tabs aligned with and extending into corresponding slots in a printed circuit board (PCB);
f. a manually operated switch incorporated into at least one of the connector hoods and in electrical connection with the electrically activated telltale.

2. The indicator circuit of claim 1 further comprising:
a. an electric circuit element incorporated into at least one of the connector hoods and in electrical connection with the electrically activated telltale;
b. wherein the electric circuit element completes the circuit for a prescribed amount of time when activated by the manually operated switch.

3. The indicator circuit of claim 1 further comprising:
a. an integrated circuit chip, incorporated into at least one of the connector hoods and in electrical connection with the electrically activated telltale;
b. wherein the integrated circuit chip completes the circuit for a prescribed amount of time when activated by the manually operated switch.

4. The indicator circuit of claim 3 wherein the integrated circuit chip pulses the power to the electrically activated telltale for a prescribed amount of time.

5. The indicator circuit of claim 1 further comprising:
a. an RFID tag incorporated into at least one of the connector hoods;
b. wherein the RFID tag completes records identifier information related to the connection location of the cable and transmits the information to an RFID reader.

6. The indicator circuit of claim 5 wherein the electrically activated telltale is selected from the group consisting of a light emitting diode, a conventional light bulb, and a liquid crystal visual indicator.

7. The indicator circuit of claim 1 wherein the electrically activated telltale emits an audio or visual signal.

8. The indicator circuit of claim 1 wherein the electric power source is a battery.

9. The indicator circuit of claim 1 wherein the electric power source is supplied by power over Ethernet (POE) power.

10. A networking cable for transmitting data or electrical power comprising:
a. a plurality of conductor wire pairs encased in a flexible sheath;
b. a connector hood on each end of the networking cable;
c. an electrically activated telltale incorporated into at least one of the connector hoods and electrically connected to at least one of the conductor wire pairs;
d. an electric power source incorporated into at least one of the connector hoods and in electrical connection with the electrically activated telltale;
e. a separator mechanism incorporated into the connector hood to provide separation of the conducting wire pairs to minimize crosstalk, the separator mechanism comprising a body having a first end facing a distal end of the respective connector hood, a second end, and a plurality of longitudinal channels extending between the first and second ends, the body including a portion configured to extend over and be coupled to a printed circuit board (PCB) disposed within the connector hood; and
f. a manually operated switch incorporated into at least one of the connector hoods and in electrical connection with the electrically activated telltale.

11. The networking cable of claim 10 further comprising:
a. an electric circuit element incorporated into at least one of the connector hoods and in electrical connection with the electrically activated telltale;
b. wherein the electric circuit element completes the circuit for a prescribed amount of time when activated by the manually operated switch.

12. The networking cable of claim 10 further comprising:
a. an integrated circuit chip, incorporated into at least one of the connector hoods and in electrical connection with the electrically activated telltale;
b. wherein the integrated circuit chip completes the circuit for a prescribed amount of time when activated by the manually operated switch.

13. The networking cable of claim 12 wherein the integrated circuit chip pulses the power to the electrically activated telltale for a prescribed amount of time.

14. The networking cable of claim 10 wherein the electrically activated telltale emits an audio or visual signal.

15. The networking cable of claim 10 wherein the electric power source is a battery.

16. The networking cable of claim 10 wherein the electric power source is supplied by power over Ethernet (POE) power.

17. The networking cable of claim 10 wherein the electrically activated telltale is selected from the group consisting of a light emitting diode, a conventional light bulb, and a liquid crystal visual indicator.

18. The network cable of claim 10 further comprising an electric power source tester integrated into the connector hood at either end of the network cable.

19. The network cable of claim 10 wherein said integrated circuit chip includes functionality that automatically indicates a condition of low electric power source power.

* * * * *